INVENTOR.
MICHAEL W. PASCAL
BY
Justin W. Macklin
ATTY

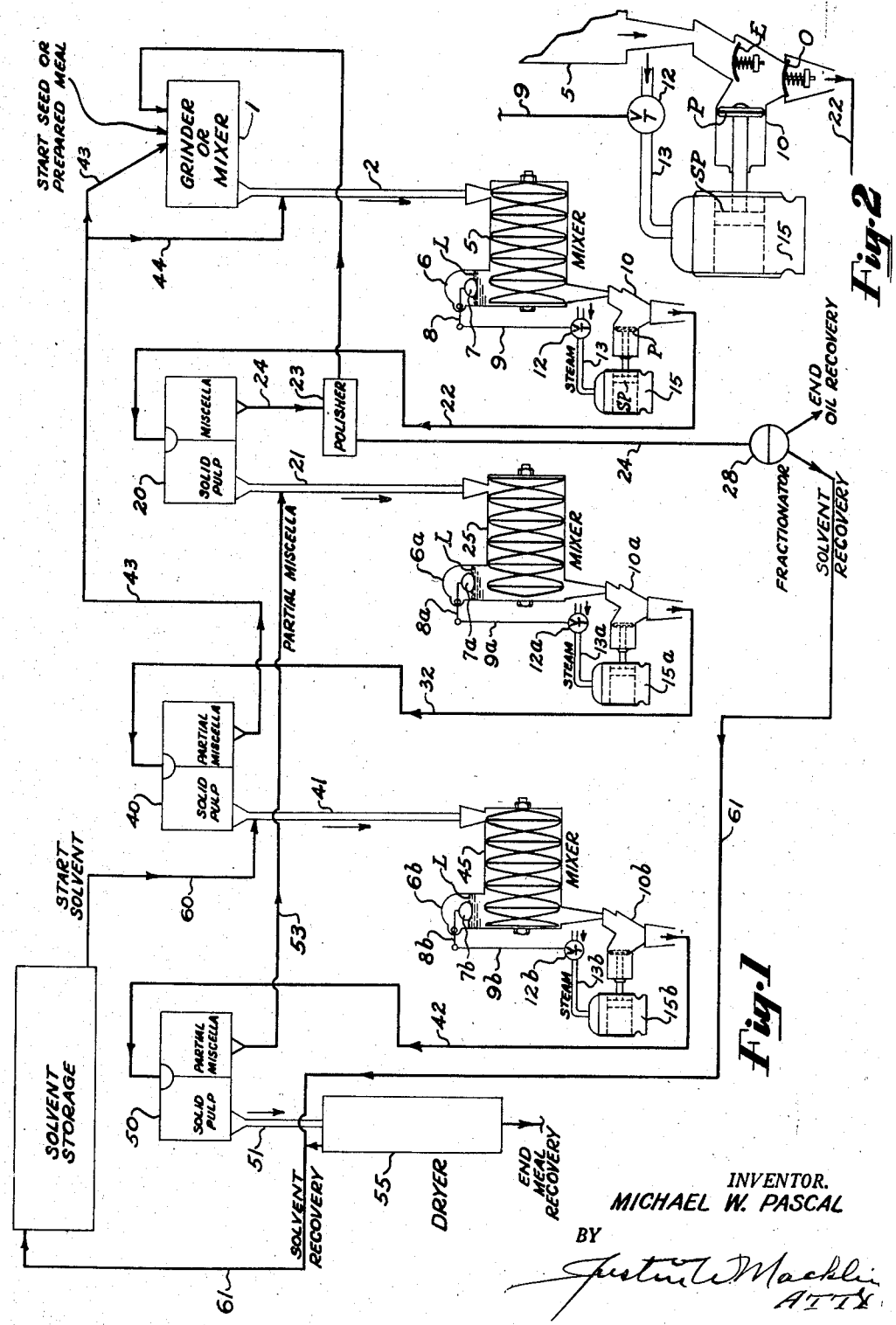

Patented Apr. 25, 1950

2,505,139

UNITED STATES PATENT OFFICE 2,505,139

SYSTEM AND APPARATUS FOR SOLVENT EXTRACTION

Michael W. Pascal, Shaker Heights, Ohio, assignor to The Sherwin-Williams Company, Cleveland, Ohio, a corporation of Ohio Application August 16, 1948, Serial No. 44,494

4 Claims. (Cl. 23—270)

This invention relates to continuous systems for the solvent extraction of vegetable oils from oil-bearing seeds, nuts, beans, and the like (hereinafter generically termed "seeds"). More particularly, the invention relates to continuous oil extraction systems involving an over-all countercurrent flow of solvent and seeds from stage to stage of a multi-stage extraction plant, with concurrent flow within each stage.

The invention is especially suited for the extraction of oil-bearing seeds of the type which are incapable of being compressed into rugged flakes through which a solvent will readily diffuse without causing the flakes to disintegrate into a loose pulp containing a large proportion of "fines" which resist separation from the solvent by conventional means, as hereinafter described. A characteristic feature of the invention is that the seeds to be extracted are first ground and dispersed in a suitable solvent to produce a slurry containing just such a pulp as has heretofore been most troublesome.

Processes for the extraction of soluble substances from various materials by counter-current solvent methods are well known. Such countercurrent processes have been employed with considerable success for the extraction of oil from soya beans after suitable preparation of the beans to form a flaked product reasonably resistant to mechanical handling and free from troublesome fines. The successful solvent extraction of oil from soya beans with such conventional processes is due to the fact that soya beans can be formed into thin, curved flakes which permit both the easy diffusion of solvent through each flake and the easy percolation of solvent through a mass of flakes.

Most commercially important oil-containing seeds, such as linseed, cottonseed, castor beans, perilla, sunflower seed, hempseed, peanuts, oiticica, tung nuts, coconuts, and the like do not possess the physical characteristics requisite for the formation of durable, thin flakes necessary for diffusion and percolation of an oil-extracting solvent and which will not disintegrate during the extraction process. Such oil-containing seeds simply disintegrate when treated with a solvent for the oil during or following mechanical grinding or crushing of the seeds. In the resulting slurry of disintegrated seeds and a miscella of oil and solvent, a portion of the seed solids may remain in the form of more or less separate fibers (rather than as fibrous cellular structures), but in all cases substantial portions of the seed solids exist as small, solid fines dispersed in an actually or substantially colloidal suspension. Heretofore such fine particles tended to follow the miscella directionally in a solvent extraction system. Under those conditions, the fines retained a large amount of oil, and special processing to remove the fines from the rich, final miscella, as by successive filtering operations, removed substantial quantities of oil with the fines, thus defeating the purpose of the process.

The art has long sought a practical, continuous, solvent extraction method for winning oil from vegetable seeds other than soya beans. The advantages of the solvent extraction of soya beans are many, the principal advantages being that a greater proportion of high grade oil is obtained and extraction of the oil from the solids is more nearly complete. By so extracting a greater proportion of oil from the solids, the proportion of proteins in the resulting meal is increased, thereby increasing the value of the meal as cattle feed. Thus, the art has been aware that solvent extraction of oil from oil containing seeds other than soya beans could probably also produce a greater proportion of high grade oil and a more valuable meal, if one could first discover a practical method and system capable of producing a miscella substantially free from fines without special and expensive processing for their removal.

Thus, it is a general object of the present invention to provide a practical system for the solvent extraction of vegetable oils universally applicable to the treatment of all oil-bearing seeds, regardless of their susceptibility to satisfactory flaking.

A further object of the invention is to provide such a continuous system for carrying out the foregoing objective with a minimum number of different operational steps for the removal of fines.

Related objects of the invention are to provide a system for solvent extraction of oil from seeds to produce the greatest possible yield of high grade oil, free from fines, while avoiding degradation of the proteins in the seed solids.

Such a method and system are disclosed in my co-pending application, Serial No. 646,034, filed February 7, 1946 (Patent No. 2,467,404). The present application is a continuation in part of that prior application and is particularly directed to an improved system and associated apparatus for carrying out the method to which the claims of that prior application are directed.

In many arts, the separation of two or more mixed materials is effected by utilization of a difference in their particle size, as by screening, or, where one of the materials is a liquid and the other a solid, by filtering in a pressure, vacuum, or centrifugal (perforate bowl) filter. In other arts, separation is obtained by utilization of differences in the specific gravities of the components, as by centrifuging in a solid bowl centrifuge or by allowing the heavier components to settle in a gravity settler or a mechanical thickener.

None of the above general procedures suggested a solution to the problem of removing from a miscella the solids of seeds which disintegrate upon contact with a solvent after suitable trituration, for the slurries so formed contain discrete solid particles of various sizes ranging down to colloidal dimensions, dispersed around and through floating, indiscrete, gelatinous masses having specific gravities equal to or possibly even slightly less than the specific gravity of the suspending miscella. With the usual pressure or vacuum filters, the fines of those oil-containing seeds which disintegrate upon trituration and contact with solvent substantially completely clog the filter almost simultaneously with the establishment of effective filtering, due primarily to the substantial quantity of gelatinous material, as well as discrete, solid particles comprising the fines. Likewise, the usual perforate bowl type of centrifuge, also termed a centrifugal filter, fails by first passing a substantial quantity of the fines and then rapidly clogging. Similarly, gravitational or mechanical thickeners fail to effect separation of such slurries. These thickeners are expected to effect separation of solids and liquids by a slow settling of the solids under the influence of gravity, aided, in the case of mechanical thickeners, by the floccule-breaking action of the rakes. However, only the larger particles of slurries of triturated, oil-containing seed solids can be removed in this manner. The fines remain suspended in the miscella as a system of minute, dispersed hulls and fibrous particles of substantially colloidal dimensions entangled with phlegm-like gels or floccules. Rather than breaking up such gels or floccules and allowing the miscella to escape from within and between them, the rakes tend to carry the entire system of miscella and dispersed fines along together.

I have discovered, however, that a continuous solid bowl type of centrifuge is operative with a surprising degree of effectiveness to separate the suspended solids from a slurry formed by the disintegration of vegetable seeds in an oil solvent. I believe the operativeness of a solid bowl centrifuge in such an operation is not due, at least not initially or entirely, to the commonly understood function of magnifying differences in the specific gravities of the components to be separated. The behavior of slurries of disintegrated oil-containing seeds in a mechanical thickener or a settling tank shows that the above-mentioned gels or floccules, with their entangled solid particles, have a specific gravity effectively equal to that of the miscella in which the fines are dispersed. Rather, I attribute the operativeness of a continuous solid bowl centrifuge in separating a clear miscella from such slurries to the fact that both the liquid miscella and the dispersed floccules are forced toward and along the wall of a solid bowl centrifuge; because of this force on the floccules themselves and the ability of the less viscous liquid in and between the floccules to flow toward and along the bowl wall, the floccules are compacted. This compacting is believed to increase the density of the floccules. Also, the miscella is not required to pass through an accumulating body of solids, as in the case of filters.

While the explanation of the phenomenon is still somewhat conjectural, I have discovered that the tendency for the fine particles of prepared oil-containing seeds to follow the solvent directionally in an over-all counter-current system is materially lessened or entirely overcome by repetitively and concurrently extracting the oil from oil-containing material with a solvent or partial miscella to produce a slurry and then treating the slurry with a continuous solid bowl type of centrifuge to establish two separable components, i. e., (1) a substantially solids-free miscella, and (2) a compacted pulp in which the proportion of solvent or partial miscella to seed solids has been greatly reduced. As a result of this unexpected phenomenon, the two components are then capable of being separated by the machine and moved counter-current to each other in the system.

It is to be understood, of course, that my process and system, which are operative for the solvent extraction of difficultly extractable seeds, such as linseed, are also operative for the solvent extraction of seeds such as soya beans which can be specially processed, i. e., "flaked," to avoid the production of fines and permit separation of the seed solids from the miscella by a simple filtering operation. When so applied, my process eliminates all necessity for performing the expensive flaking operation.

In carrying out my invention I preferably repeat a series of steps as many times as may be necessary to effect extraction of 98% or more of the oil and to leave a residue of extracted solids containing less than 1% oil. Each such series of steps constitutes an extraction stage and comprises, in the main, (1) a mixing operation to effect diffusion of solvent through a triturated mass of seed solids and to produce a slurry of seed solids, solvent, and dissolved oil, and (2) a separating operation in a solid bowl type of centrifuge for separating the solids from the major portion of the solvent and dissolved oil. The several stages are coordinated into a system wherein the seed solids and solvent move counter-current between stages. To this end, when employing a three stage system, the seeds are first triturated and mixed with solvent and oil obtained as a partial miscella from a succeeding stage, preferably by grinding the seeds directly into the partial miscella. The resulting slurry is then passed through a mixer (diffuser) with a sufficient holdup time to effect thorough diffusion of the solvent through the seed solids. The slurry then goes to a first solid bowl centrifuge, where the solids are separated from the miscella. The solid matter from the first centrifuge is then again contacted with solvent in the form of a partial miscella from a third separation stage and is passed through a second diffuser to a second, similar centrifuge. The solids are then contacted with fresh solvent and passed through a third diffuser and a third, similar centrifuge. The now substantially oil-free solids pass from the third centrifuge to a desolventizer to strip and recover retained solvent therefrom, which solvent is condensed and returned to storage for reuse in the system as fresh solvent. The miscella from the first stage centrifuge is filtered or otherwise freed of minor quantities of extraneous matter and pumped to a distillation system or fractionator where the solvent is stripped from the oil. The oil, now ready for use, is sent to storage, and the solvent recovered from the fractionator is returned to solvent storage for reuse in the system.

While the movement of solids and partial miscella or solvent is concurrent, or substantially so, within each separation stage, the overall movement of oil-containing material (introduced at the initial stage) and solvent (introduced at the final stage) is counter-current. The number of repeated stages necessary may vary from two to six or more, but I have found that three stages will ordinarily extract 98% or more of the available oil, producing a residue of solids containing less than 1% oil and producing a miscella that is, at the worst, only slightly clouded with a minor amount of suspended fine particles. Such slight cloudiness of the miscella is easily removed by a simple polishing filter; and the fines so removed are returnable to the extraction system to recover the oil contained therein.

It is in the formation of the slurries in the mixers of the several stages that the oil in the seed solids is extracted by diffusion of fresh solvent or partial miscella into the seed solids, thereby forming oil-enriched miscellas which become progressively richer in the several stages from the last stage toward the first stage. Accordingly the mixing vessels are preferably suitably insulated and equipped with coils, jackets, or other heating devices (not shown) in order that an optimum extracting temperature may be maintained. This optimum extracting temperature varies according to the oil being extracted and the solvent employed, as is well known in the art. Thus, for example, with hexane as a solvent for extracting linseed oil, room temperatures are quite satisfactory, but with heptane as a solvent for extracting castor oil, a temperature of 50° C. or higher is desirable for efficient extraction.

In such a system, an important factor of efficiency is the ability to maintain in equilibrium, or in a controlled relationship, the conditions of materials flowing to and from and being treated in the respective stages. Also, at least the required minimum diffusion time should be maintained in each stage, and accordingly, the movement of material through each stage must be controlled to maintain the desired relative conditions in the adjacent stages. To accomplish this, I have devised and designed a special steam pump capable of moving the mixtures of solids and solvent from one piece of apparatus to the next. Further, I have provided means for so coordinating the operation of such a pump, for each stage, with relation to conditions in that stage, as to maintain the relative conditions required for greatest efficiency.

It has been found in the handling of such mixtures of solids and solvent that varying differences in specific gravity of the constituents, high ratios of liquids to solids, the known surface tension of hydro-carbon solvents, and other special conditions and characteristics all combine to complicate the pumping problem. For all practical purposes, the conditions encountered render the use of known types of pumps unsatisfactory. Ordinary pumping apparatus quickly becomes inoperative in such a system, and resort must be had to the disposition of equipment in a superposed or multi-story arrangement to effect gravity flow of the slurries within each stage as well as of separated pulp moving between stages. Such an arrangement is to be avoided if possible because of the poor economy of such a multi-story arrangement and the lack of any positive driving force to clean out conduits which inevitably tend to become plugged with settled solids, particularly at points where the conduits may be restricted by any kind of flow control valves. Numerous other disadvantages of a gravity system for transporting slurries within each stage render such a system highly unsatisfactory.

Thus, an important object of the present invention is to provide a simple, effective system and apparatus for controlling the movement of materials to be handled in carrying out a process such as has been described herein and in my above-mentioned prior application.

Another important object of the present invention is to provide in the system a specially designed, simple, and efficient pump which shall take advantage of the very characteristics of the fluids to be pumped which have heretofore presented such difficulties.

A related and more specific object is to so construct such a pump that, as required to maintain the desired equilibrium in the system, it may be run at varying speeds and be capable of continuous or intermittent operation under the difficult conditions described.

Still another related and specific object of the invention is to provide in each stage of the system a pump which will also serve as an efficient and reliable metering device for the fluids handled therein so that the necessary pump speeds for maintaining the desired rates of flow throughout the system can be accurately computed and the pumps governed accordingly.

Still another object is to so arrange the system that changes in certain conditions in a given stage may govern its associated pump to return those conditions, and other conditions dependent thereon, to the desired state for most efficient operation.

The foregoing and other advantages attained by the present invention should become apparent as the description proceeds.

An arrangement of apparatus in a three stage system embodying and utilizing my novel pump and condition - responsive pump controlling means, is diagrammatically illustrated in the accompanying drawings in connection with which the following description is intended to make the operation readily understood. An illustrative embodiment of my novel pump is also shown in the drawings, somewhat less diagrammatically, and appropriate description refers thereto.

In the drawings, Fig. 1 is a largely diagrammatic flow sheet showing simultaneous and concurrent flow within each of a series of three repeated stages of extracting apparatus and thickening and compacting apparatus, the stages including the pumping or impelling means and condition-responsive controls therefore and being arranged in an overall counter-current system;

Fig. 2 is a diagrammatic detail showing the general arrangement of the piston and valves in my novel pump;

Figure 3:
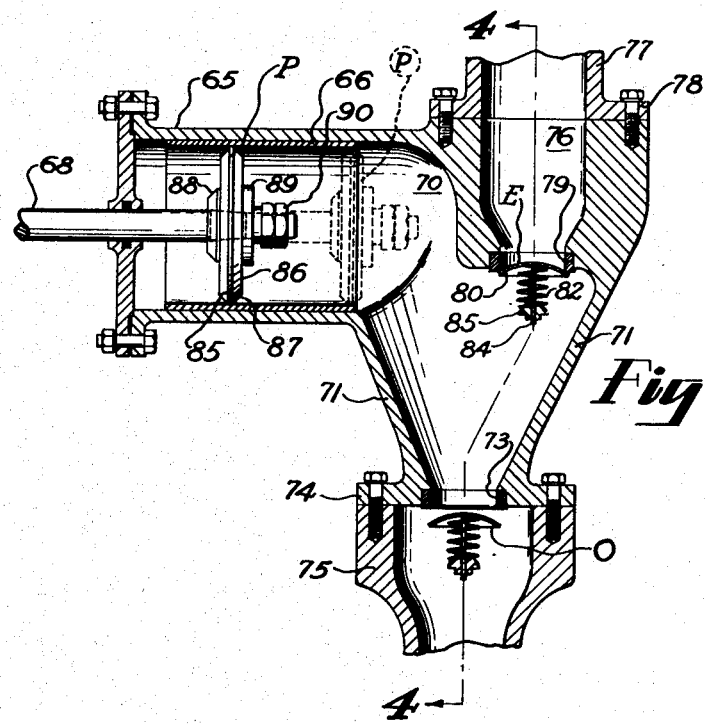
Fig. 3 is a central longitudinal section showing a preferred arrangement of passages, special valves, and novel piston in my preferred form of pump for such a system.

Explanatory legends and labels have been applied to the diagram of Fig. 1, in addition to the reference characters. This diagram illustrates a preferred arrangement of the apparatus in my oil extraction system. The rectangle 1 illustrates any suitable means, such as a mixer and/or grinder, in which the oil-containing mass of comminuted seed solids is intermingled with a partial miscella (oil and solvent) obtained from a succeeding separation stage. The meal and partial miscella are fed concurrently through a conduit 2 to any suitable mixer or diffuser 5 within which the partial miscella may diffuse through the seed solids to dissolve a portion of the oil in the solids and to form a slurry.

The slurry passes to an impelling means and thence to a solid bowl type of centrifuge, indicated at 20. It is preferable that the slurry from the mixer 5 be passed downwardly to the pumping means, comprising my specially constructed pump 10 actuated by the piston in a steam cylinder 15.

The passage from the pump to the centrifuge 20 is indicated by the line 22. In the centrifuge 20 the slurry is separated into two components, namely, a substantially solids-free miscella and a pulp of thickened and compacted seed solids.

By the term "solid bowl centrifuge," as used herein, I intend to include not only the well known Bird type of solid bowl centrifuge (manufactured by Bird Machine Co., South Walpole, Mass.), which continuously discharges both of the phases separated therein (miscella and extracted pulp), but also the type of solid bowl machine known as the "Quiroz" centrifuge (Chemical Machinery by Riegel, pp. 313–314, Reinhold, 1944), from which a liquid phase is continuously discharged and a solid or semi-solid phase is intermittently, but automatically, discharged without interruption of the separating operation. Likewise, I intend to include mechanical variations of these known commercial devices in which are provided an imperforate hollow bowl having the general interior form of a truncated cone and which is mounted for rotation about its axis, a source of power for rotating the bowl about its axis to subject a slurry therein to centrifugal force for compacting the solids of the slurry against the interior surface of the bowl while the liquid therein is moved along said surface toward one end of the bowl by centrifugal force, and mechanical ejecting means for automatically discharging the compacted solids from said bowl adjacent the opposite end thereof while it is rotating.

While at least two successful types of mechanisms have been devised for ejecting solids separated from a liquid slurry in a continuous solid bowl centrifuge while the bowl is rotating, I prefer to employ the type which discharges the solids continuously, as in the Bird machine, rather than intermittently as in the Quiroz machine. The Bird type, employing a longitudinally tapered screw coaxially mounted inside the generally conical bowl, and driven at a different speed than the bowl, is particularly effective for handling the large proportion of solids present in slurries of the type herein described. Because of the small clearance between the screw and the bowl wall, there is little opportunity for solids to accumulate and linger in any one part of the bowl from which they might later be difficult to dislodge. Also, the solids are moved by a more positive mechanical force than the centrifugal force that is alone responsible for exit movement of solids from the Quiroz type of machine.

The solids-free miscella is drawn off from this initial separation stage through a passage indicated at 24 to a polisher 23, and then to a fractionator 28. As hereinbefore indicated, the polisher may be any conventional type of filter or system of filters which will remove any minute quantities of fine, solid particles remaining in the miscella withdrawn from the solid bowl centrifuge 20 in the first extraction stage. Complete removal of any traces of "fines" by the polisher 23 is essential to avoid clogging the condensers in the fractionator, for such fine solid particles in the miscella going to the fractionator are actually capable of being entrained by solvent vapors leaving the still and being deposited on the inner surfaces of the condensers.

The fractionator 28 may be of conventional design for heating the final miscella, preferably while blowing dry steam or inert gas through it, to drive off the solvent, and for collecting and condensing the solvent vapor. When extracting castor oil from castor beans, the recovery of oil from the partial miscella preferably includes a phase separation step wherein an oil-poor (3 to 5% oil) phase containing the major portion of the solvent is separated and returned to the extracting stages for use as extracting liquid. In this case only a portion of the final miscella, comprising most of the extracted oil and around one quarter of the solvent, passes to the fractionator for solvent removal. The employment of such a phase separation step is the subject of my copending application Serial No. 646,033, filed February 7, 1946, and entitled "Solvent extraction of castor oil," now Patent No. 2,467,403.

The solvent recovered from the fractionator 28 is passed through the line 61 back to solvent storage for reuse in the system. The oil withdrawn from the fractionator is substantially solids-free and solvent-free, and constitutes a high grade raw oil.

The pulp or seed solids withdrawn from the centrifuge 20 pass (preferably downwardly) through a conduit 21 to a second mixer or diffuser 25. A screw feed or the like (not shown) may be employed for transporting the thickened and compacted pulp discharged from the centrifuges if a gravity feed is not convenient at these points. At this mixer 25, or as the once extracted pulp passes from the centrifuge 20 to this mixer, more liquid of oil and solvent from the centrifuge of a succeeding stage, i. e., the third separation stage, is added to the pulp.

From the mixer 25 the liquid miscella and solids move concurrently as a slurry to another special pump 10a, similar to the first one 10, and shown as operated by a steam cylinder and piston 15a. This slurry is pumped through a passage 32 to another solid bowl type of centrifuge, indicated at 40. From this centrifuge 40 the separated seed solids are passed through a conduit 41, and the liquid, i. e., partial miscella of oil and solvent from the centrifuge 40, is led through a return counter-current line 43 and is mixed with the meal at the mixer or grinder 1, as previously described. A branch line 44 may lead additional partial miscella to the passage 2 between the mixer or grinder 1 and the first diffuser or mixer 5.

Fresh solvent is introduced into the conduit 41 through the line 60, and the resulting mixture of solvent and twice extracted pulp is fed to a third mixer 45.

From the mixer 45, a similar special pump 10b, actuated by a third steam cylinder and piston 15b, moves the slurry through a passage 42 to a third and, in this case, final centrifuge, designated 50. From this centrifuge, a conduit 51 leads the completely extracted seed solids to a suitable desolventizing means, designated 55, from which a substantially solvent-free and oil-free meal is finally delivered.

The solvent and oil (partial miscella) from the centrifuge 50 are fed back through a passage 53 to the conduit 21 which leads the solids from the first stage centrifuge 20 to the second stage mixer 25.

It will be seen that, with the arrangement shown, prepared oil-rich meal is introduced into the system and is mixed with a relatively oil-rich partial miscella from the centrifuge 40 of the second stage and is fed concurrently therewith to the mixer 5 in the initial stage. A less oil-rich partial miscella from the centrifuge 50 of the third stage is mixed with the partially extracted seed solids delivered from the centrifuge 20 of the first stage and is fed concurrently therewith to the mixer 25 in the second stage; and pure solvent is introduced into the system and mixed with the twice extracted seed solids delivered from the centrifuge 40 of the second stage as these solids are transported to the mixer 45 of the third stage.

In carrying out this system with such an arrangement of apparatus, the desired proportions of meal or pulp to the extracting liquid should be maintained in balance for maintaining the most effective conditions throughout the system, and this control is effected by the quantity of meal fed into the initial stage, and by the amount of fresh solvent admitted through the lines 60 and 41 to the mixer 45 and centrifuge 50 comprising the third or final stage.

For maximum efficiency, the rates of flow throughout the system with relation to the condition obtaining in each mixer, and consequently in the succeeding centrifuge, should be maintained in as nearly uniform relative conditions as possible. To accomplish this important function automatic controls are employed for governing the volume of flow taken from each mixer and delivered to its associated centrifuge.

An automatic control means is illustrated which is responsive to changes in the level of liquid or slurry in each mixer, the variation in this level being utilized to vary the flow of steam to each steam pump. Such an arrangement is diagrammatically illustrated in Fig. 1, wherein a dome 6 rises above the body or barrel of the mixer 5, and liquid or slurry rises in this dome to a variable level shown at L. A float 7 is carried on a pivoted lever 8 which, in turn, is pivoted to a link 9 arranged to operate a throttle valve 12 in the steam line 13.

Similar floats 7a and 7b are shown as responsive to liquid level changes in the mixers 25 and 45, respectively, while levers 8a and 8b and links 9a and 9b operate throttle valves 12a and 12b for the steam lines 13a and 13b leading to the steam cylinders 15a and 15b, respectively.

In Fig. 2, the pump, shown as connected to the mixer 5, is enlarged somewhat to show the valve and pump piston arrangement, in an otherwise diagrammatic view. Here it will be apparent that the slurry is caused to flow downwardly over two downwardly opening valves, the character E indicating the inlet valve and the character O the outlet valve, while the material is impelled by the pump piston P operated by the steam piston SP in the cylinder 15.

It will be noted that in this pump arrangement there is no large surface on which downwardly settling solid matter or particles can accumulate.

Figure 4:
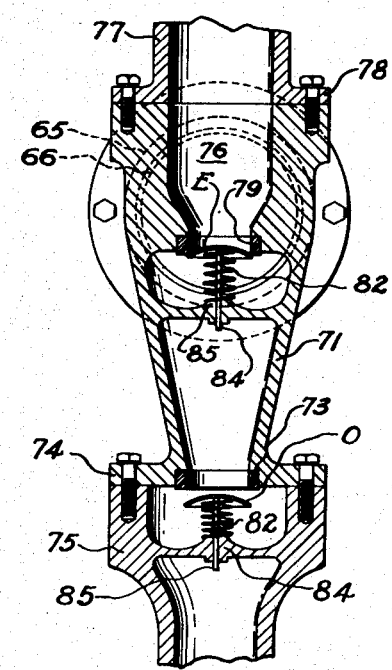
Fig. 4 is a transverse section taken on the line 4—4 of Fig. 3.

This feature and other characteristics of a pump designed in accordance with this arrangement, and for the purposes heretofore outlined in this specification, may be more fully understood in connection with the sectional views of Figs. 3 and 4. Here, the pump casing is shown as comprising a cylinder 65 having a suitable liner sleeve 66 in which the specially formed piston P is reciprocated through the action of the piston rod 68 connecting this piston with the steam piston SP. At the conclusion of its pumping stroke, the piston preferably reaches the very end of the liner sleeve 66 as shown by dotted lines in Fig. 3, thus leaving no part of the inner surface of the sleeve projecting beyond the piston where solids could accumulate. The cylinder 65 is connected with a housing which forms a chamber 70, at the pressure end of the piston, which leads downwardly along a generally conical wall 71, sloping as near to vertical as is practicable while retaining a preferred convergence of the wall 71 toward an outlet valve opening 73.

The converging wall 71 of the chamber 70 is provided with a suitable outer flange 74 fitted to a discharge housing 75 for the outlet valve O. The pump casing also includes an upwardly extending portion forming an inlet opening 76 surrounded by a boss to which an inlet passage fitting 77 may be secured by a flange 78 bolted to the boss of the casing.

The lower end of the inlet passage 76 is shown as converging slightly to a ring forming a valve seat 79 for the inlet valve E.

The valves O and E may be substantially alike, and a brief description of one will be sufficient. As shown, a valve head 80 is formed with a convex upper surface, thus presenting a surface sloping away from the on-coming stream or current of flow to minimize solids accumulation. The valve seat or ring 79 engages the valve head 80 near the perimeter of the upper surface thereof. Closure is effected under the influence of back pressure and is assured by a coil spring 82, normally holding the valve seated. This spring may surround a stem 84 slidable through a boss 85 and guiding the head to its seat. The boss 85 may be attached to and supported from the conical wall 71.

Other forms of downwardly opening valves may be used, but this special valve construction minimizes a normal tendency of most conventional valves to accumulate solid or semi-solid matter above the same or on their supports or associated parts.

As the piston comes to the inner end of its stroke, that is, toward the right hand end of the cylinder liner 66, as viewed in Fig. 3, liquid with the solid material carried therein is pushed away from the horizontal cylinder surface of the lower part of the liner. The merging of the chamber 70 with the downwardly sloping surfaces of the wall 71 assures that any settling material shall move downwardly freely toward the discharge opening 73 and the outlet passage around the discharge valve. Likewise, the incoming fluid and any solid content therein is moved downwardly when the piston recedes to the left, as viewed in Fig. 3, and that portion of fluid with its burden of solids which follows the piston will be immediately thrust inwardly, on the return of the piston, clear of the cylinder surface on which the solid matter would otherwise tend to settle.

As mentioned above, the solid matter in the liquid has a tendency to accumulate and harden between the surfaces of the piston and cylinder of a pump used in such a system, and this results in binding and damage to the surfaces, sometimes stopping the pump. Such binding requires frequent opening of the cylinder and removal of the piston for cleaning, with consequent interruption of the operation of the system.

I have overcome this binding difficulty by so forming the piston P that it presents a narrow band of contact with the cylinder wall. This narrow contact surface is indicated at 85, and, of course, forms a snug sliding fit with the inner surface of the cylinder. A convenient method of making this piston is to bevel or chamfer the cylindrical edges of a disk 86 as indicated at 87. This disk may then be secured, as by collars 88 and 89 and removable lock nuts 90, to the end of the piston rod 68 in accordance with usual practice.

Figure 5:
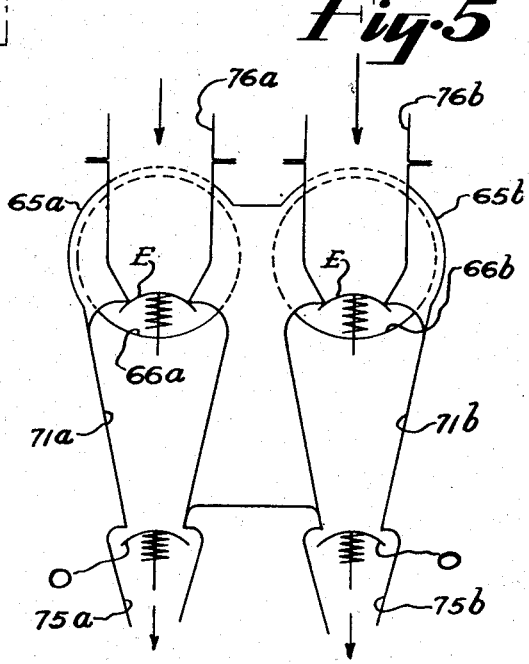
Fig. 5 is a diagrammatic view indicating the use of a plurality of cylinders for my novel pump.

The diagrammatic section, shown in Fig. 5, indicates a two cylinder pump, and may be considered illustrative of any number of cylinders which it may be found practical to use. In such a multiple cylinder arrangement, a separate set of inlet and outlet valves is provided for each piston in accordance with the principles described above. A steam cylinder and its piston, with means for effecting reciprocation thereof in accordance with common practice, may operate each pump piston.

In this diagrammatic view (Fig. 5) the inlet valves are designated E and E and the outlet valves are designated O and O. The cylinders 65a and 65b have their inner surfaces or liners 66a and 66b communicating with the downwardly converging chambers 71a and 71b, respectively. The inlet passages 76a and 76b correspond to the inlet passage 76 while the outlet fittings 75a and 75b correspond to the outlet fitting 75 of Fig. 4.

Pumps of my particular design have been found to be very successful in maintaining continuous operation of my system, and in overcoming the various difficulties which were encountered in the use of other types of pumps, or an ordinary reciprocating steam pump.

Prior attempts to pump the slurry in my oil extraction system resulted in accumulations of solids and semi-solids, with consequent stoppage of the pumps, and thus of the entire system. At best, stoppage occurred after only very short intervals of operation with other pumps tested.

Having in mind the desirability of maintaining uniform flow from stage to stage, and uniform conditions in each stage, and in view of the rapidity with which the heavier solid particles separate from the liquids, it is desirable to maintain substantially continuous flow. However, in practice, it is found that there is, at times, wide variation in the rate of flow. A pump may be stopped, or nearly stopped, momentarily, and the next minute it may be called upon to pump at the rate of many gallons per minute, in response to the governing control of the liquid level L in the associated mixer.

It is known that, with non-polar solvents, such as heptane, hexane, or octane, and mixtures of such aliphatic hydro-carbons generally used for extracting oil from oil-bearing seeds, there is a rapid separation between the marc and the solvent. This results in very quick settling or sinking of at least some of the solids. It follows that, even though complete settling might be very slow, there is rapid settling of the larger seed particles, which tend to build up a volume of material within the pump ahead of the pumping piston sufficient to block it in a short time of operation, unless the pump is so designed that its passages, piston chamber and inlet and outlet valves preclude and avoid the accumulation. In the pump construction, disclosed herein, there are no points or surface areas where solids can accumulate sufficiently to interfere with continuous operation of the pump.

The described characteristics of quick, partial separation of solids and solvent preclude the use of any known method of regulating flow by throttling or restricting passages of flow lines of the system. Such attempts result in grave troubles of plugging and separation, particularly where effected by a restricted orifice in a line.

In my system, because variation in the level of slurry in the mixers controls the steam to the pumps, as above stated, there may be momentary variation from full stop to near full pump capacity reaching many gallons of pump delivery per minute. Accordingly, in the pump construction and in the passages from each pump to each connected centrifuge, it is desirable that whatever accumulation occurs, which may cause incipient plugging or constitute a settling above the valves in the pump, shall be effectively removed upon the re-establishing of flow. This is accomplished by my unique pump design, which is such that it is essentially self-flushing. Wherever solid material tends to gather within the pump, there shall be above it a more solid-free liquid. Any accumulation of solid material withing the pump will thus be flushed away with new "wet mixture" and suspension of the accumulated solids in the liquid re-established.

The arrangement of the valves and valve springs is such that whatever settling occurs is principally below the valves. Thus, the valves can seat without interference. Again, if there be a slight accumulation at the top of the convex valve surfaces, the higher, less solid-laden liquid is caused to flush and re-mix such accumulation.

Even though an ordinary reciprocating pump be continuously run at a uniform speed, there will be some separation and accumulation of solids in the chambers of such pumps at the inner ends of the piston strokes, and in a short time such solids become packed ahead of the pistons to a degree actually sufficient to force the pumps to a stall. Likewise, with the usual arrangement of valves, material becomes packed beneath and above them, rendering them inoperative. With my new pump construction, it is possible to stop the pumps and start them again while avoiding the foregoing difficulties due to accumulations of solids within the pumps themselves.

At times the settling of solids in the passages 22, 32, and 42 on the high pressure sides of the pumps may completely plug these passages and create back pressures against the pumps which are many times greater than the normal static heads which the pumps would be excepted to encounter as a result of differences in levels of the centrifuges and associated mixers. By eliminating the major difficulties which rendered conventional reciprocating pumps inoperative in the system, I have been able to take advantage of the positive pumping force and high pump pressures obtainable with such pumps to dislodge settled solids in the passages leading from the high pressure sides of the pumps.

A further advantage resulting from the provision of a satisfactory reciprocating pump is the special utility of this type of pump as a metering device enabling appropriate pump speeds to be selected for maintaining a balanced system.

While other types of pumps, such as gear pumps, for example, are often satisfactory metering devices, they are not accurate for this purpose under the severe and widely varying operating conditions encountered in the present system.

The foregoing description covers the general features of my solvent extraction system as a whole and details of certain particularly significant features thereof. Where detailed descriptions of individual features have been omitted, the use of more or less conventional apparatus and equipment is contemplated, or, at least, apparatus and equipment which one skilled in the art would be expected to provide by the exercise of ordinary principles of plan design. Wide variations in the construction of such apparatus and equipment are to be expected where the demands of the process do not impose precise design restrictions. Accordingly, for the sake of brevity, the disclosure herein has been presented in a schematic fashion to a considerable degree, particularly where more or less conventional designs of apparatus and equipment can be employed.

Having thus disclosed my invention, I claim:

1. In a system and apparatus for multi-stage over-all counter-current solvent extraction of oil from oil-bearing seeds in which each of the several stages comprises a mixer, and a continuous solid bowl centrifuge for receiving slurry from the mixer and separating the slurry into a substantially solids-free miscella and a thickened pulp, and a passage for moving a slurry of oil-containing seed solids and solvent from the mixer to the centrifuge, a pump in said passage of each stage for forcing said slurry through said passage, said pump comprising a casing defining a cylinder and a pump chamber communicating therewith, a power driven piston mounted for reciprocation in said cylinder, said chamber having inlet and outlet openings for passing slurry into and out of the chamber, a valve seat mounted in each of said openings, and a valve disposed below each of said valve seats for engaging the valve seats and closing the openings, said valves being mounted for opening movement away from the valve seats and in a downward direction.

2. The system described in claim 1 in which the outlet opening of the pump chamber is physically located below the pump piston, the entire inside surfaces of the pump chamber sloping to drain uninterruptedly toward the outlet valve.

3. The system described in claim 1, including in each stage: means for operating the pump in that stage at variable speeds and governing means controlling the speed of the pump in response to liquid level changes in the mixer connected with the pump.

4. In a system and apparatus for multi-stage over-all counter-current solvent extraction of oil from oil-bearing seeds in which each of the several stages comprises a mixer, and a continuous solid bowl centrifuge for receiving slurry from the mixer and separating the slurry into a substantially solids-free miscella and a thickened pulp, and a passage for moving a slurry of oil-containing seed solids and solvent from the mixer to the centrifuge, a pump for forcing a slurry from the mixer to the centrifuge and comprising a reciprocating piston and cyinder therefor, and a pump chamber at one end of said cylinder, inlet and outlet valve passages respectively leading to and from said chamber, the valve passages and chamber being so arranged that the inner surfaces thereof all slope to drain uninterruptedly toward said outlet valve passage, and said piston being so disposed in said cylinder that the pressure end thereof registers at the conclusion of its pumping stroke with a surface of said chamber sloping downwardly therefrom.

MICHAEL W. PASCAL.

REFERENCES CITED

The following references are of record in the file of this patent:

UNITED STATES PATENTS

| Number | Name | Date |
|---|---|---|
| 863,062 | Griswold | Aug. 13, 1907 |
| 1,381,706 | Hapgood | June 14, 1921 |
| 1,492,656 | Turrentine | May 6, 1924 |
| 1,694,361 | Sterling | Dec. 4, 1928 |
| 2,164,189 | Hund | June 27, 1939 |
| 2,377,136 | Dinley | May 29, 1945 |

OTHER REFERENCES

Perry, Chem. Eng. Handbook (1941), pp. 1816-17, McGraw Hill, New York city.